United States Patent
Seong et al.

(10) Patent No.: US 9,156,100 B2
(45) Date of Patent: Oct. 13, 2015

(54) ELECTRODE WIRE FOR ELECTRO-DISCHARGE MACHINING AND METHOD FOR MANUFACTURING THE SAME

(76) Inventors: Ki-Chul Seong, Pyeongtaek-si (KR); Hyun-Soo Seong, Pyeongtaek-si (KR); Hyun-Kook Seong, Pyeongtaek-si (KR)

(*) Notice: Subject to any disclaimer, the term of this patent is extended or adjusted under 35 U.S.C. 154(b) by 455 days.

(21) Appl. No.: 13/568,732

(22) Filed: Aug. 7, 2012

(65) Prior Publication Data
US 2013/0037523 A1 Feb. 14, 2013

(30) Foreign Application Priority Data
Aug. 8, 2011 (KR) .................. 10-2011-0078517

(51) Int. Cl.
| | |
|---|---|
| B23H 7/08 | (2006.01) |
| C23C 28/02 | (2006.01) |
| C25D 5/50 | (2006.01) |
| C25D 7/06 | (2006.01) |

(52) U.S. Cl.
CPC B23H 7/08 (2013.01); C23C 28/02 (2013.01); C23C 28/021 (2013.01); C23C 28/023 (2013.01); C25D 5/50 (2013.01); C25D 7/0607 (2013.01)

(58) Field of Classification Search
CPC ........ B23H 7/08; C23C 28/02; C23C 28/021; C23C 28/023; C25D 5/50; C25D 7/0607
See application file for complete search history.

(56) References Cited

U.S. PATENT DOCUMENTS

| | | | |
|---|---|---|---|
| 4,341,939 A * | 7/1982 | Briffod et al. | 219/69.12 |
| 6,306,523 B1 | 10/2001 | Seong | |
| 6,482,535 B2 | 11/2002 | Seong | |
| 6,492,036 B2 | 12/2002 | Seong | |
| 8,822,872 B2 * | 9/2014 | Seong et al. | 219/69.12 |
| 2006/0138091 A1 * | 6/2006 | Lee | 219/69.12 |
| 2008/0061038 A1 * | 3/2008 | Blanc et al. | 219/69.12 |
| 2010/0163529 A1 * | 7/2010 | Sato et al. | 219/69.15 |

FOREIGN PATENT DOCUMENTS

| | | | |
|---|---|---|---|
| JP | 03-32524 A | * | 2/1991 |
| JP | 6-143038 A | * | 5/1994 |
| JP | 2001-219318 A | * | 8/2001 |

(Continued)

OTHER PUBLICATIONS

Machine translation of Japan Patent document No. 2001-219,318, Aug. 2001.*

*Primary Examiner* — Geoffrey S Evans
(74) *Attorney, Agent, or Firm* — Birch, Stewart, Kolasch & Birch, LLP (57) ABSTRACT

An electrode wire for electro-discharge machining and a method for manufacturing the same. The method includes preparing a wire rod, which includes a first metal and has a first diameter, as a core wire, plating a second metal on the core wire, performing a fine wire process for the core wire plated with the second metal so that the core wire has a second diameter, while forming a corrugation having a predetermined pattern on a surface of the core wire having a second diameter, and performing a heat treatment process to form a first alloy layer at a boundary surface between the core wire and the second metal through a mutual diffusion between the core wire and the second metal, and to form a second alloy layer at an outer portion of the first alloy layer through diffusion of the first metal toward the second metal.

8 Claims, 3 Drawing Sheets

(56) References Cited

FOREIGN PATENT DOCUMENTS

| KR | 10-0518727 | B1 | | 10/2005 |
|----|------------|----|---|---------|
| KR | 10-0518731 | B1 | | 10/2005 |
| KR | 10-0518733 | B1 | | 10/2005 |
| RU | 1814580 | A3 | * | 5/1993 |

* cited by examiner

ND METHOD FOR MANUFACTURING THE SAME

ELECTRODE WIRE FOR ELECTRO-DISCHARGE MACHINING AND METHOD FOR MANUFACTURING THE SAME

TECHNICAL FIELD

The present invention relates to an electrode wire for electro-discharge machining and a method for manufacturing the same. In more particular, the present invention relates to an electrode wire for electro-discharge machining and a method for manufacturing the same, capable of reducing micro-particles generated when an electrode wire is subject to the electro-discharge machining and improving the machining speed and the surface roughness of a workpiece.

BACKGROUND ART

Figure 1:
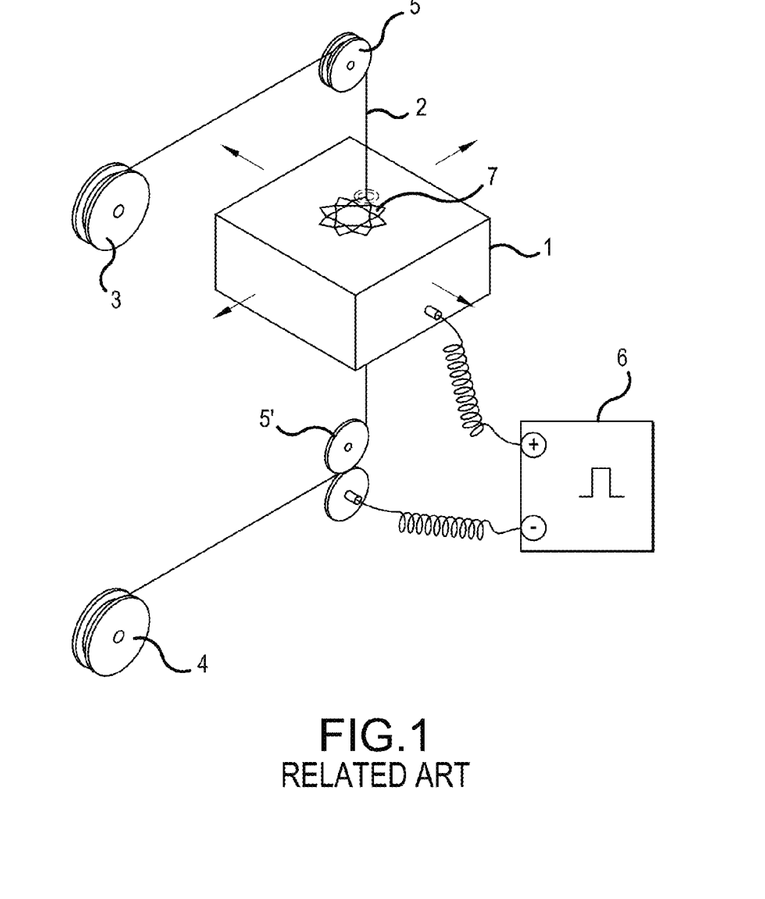
FIG. 1 is a schematic view showing the technical configuration and the principle of an electro-discharge machine according to the related art.

In general, as shown in FIG. 1, according to an electro-discharge machining scheme employing an electrode wire 2 for electro-discharge machining, the electrode wire 2 is inserted into a workpiece 1 through a start hole 7 which has been previously perforated through the workpiece 1. A high-frequency voltage is applied between the electrode wire 2 and an inner wall surface of the start hole 7 while the electrode wire 2 is being continuously inserted into the workpiece 1 in the perforation direction of the start hole 7, thereby generating arc between the electrode wire 2 and the inner wall surface of the start hole 7, so that the workpiece 1 is melted. Then, melts are removed by using a machining liquid and the instantaneous vaporization power between the electrode wire 2 and the workpiece 1, so that the workpiece 1 can be machined in a desired shape.

According to the electro-discharge machining principle, an electro-discharge machine includes a power supply, a wire transferring unit for electro-discharge machining, a workpiece transferring unit, and a machining liquid circulating unit.

In general, as indicated by the arrow in FIG. 1, the workpiece transferring unit moves perpendicularly to the electrode wire 2 for electro-discharge machining. After the electrode wire 2 for electro-discharge machining continuously reeled out of a supply reel 3 is hang on guide rollers 5 and 5' provided at both end portions of the workpiece 1, the electrode wire 2 is wound around a winding reel 4.

In this case, a high frequency-voltage is applied between the workpiece 1 and the electrode wire 2 for electro-discharge machining through the power supply 6 to perform a cutting machining process, and deionized water is supplied to a machining region as a machining liquid in order to discharge heat emitted in the cutting machining process. The efficiency of the electro-discharge machining, especially, the machining speed, significantly depends on machining parameters such as the feeding speed of the machining liquid, machining current density, and the shape and frequency of the machining voltage, and the efficiency of the electro-discharge machining can be improved by adjusting the machining parameters.

Pure copper has been used in a conventional technology since the pure copper has high electrical conductivity and facilities a fine wire process due to a high elongation property. However, since a pure copper line represents a low tensile strength in the electro-discharge machining, the pure copper may be easily disconnected. In addition, a high tensile strength cannot be applied to the copper line, so that vibration of the electrode wire 2 cannot be controlled, thereby resulting in an inferior machining accuracy.

In addition, the copper wire represents a relatively slower machining speed. Therefore, a high strength wire such as a molybdenum wire or a tungsten wire has been used for a special application of high machining precision. In addition, a brass electrode wire, such as a brass wire including copper and zinc in a weight ratio of 65%:35%, has been developed for the general purpose of wire electro-discharge machining.

When comparing with a pure copper wire, the brass electrode wire has a tensile strength which is at least twice greater than the tensile strength of the copper wire, and more improves discharge stability and instantaneous vaporization power due to zinc which is an alloy component of the brass electrode wire. Accordingly, when comparing with the pure copper wire, the brass electrode wire improves the machining speed and the machining precision.

In addition, as the electro-discharge machining scheme has been extensively used, the demand for the improvement of a tensile strength and the machining speed is increased. Accordingly, an advanced brass electrode wire has been developed by adding a small amount of Al, Si, and the like to the brass electrode wire, so that the tensile strength and the machining speed of the brass electrode wire can be improved.

Meanwhile, as zinc content is increased in a brass alloy, the machining speed may be increased. However, if the zinc content is more than 40 weight % in the brass alloy, a weak brittle phase β is formed, so that a drawing process may be difficult when a fine wire is formed.

In order to solve the above problem, the inventor of the present invention has suggested the structure of an electrode wire in Korea Patent Registration No. 10-518727, in which the electrode wire includes a core wire including a first metal including copper, an alloy layer, which is formed from an outer portion of the core wire toward the center of the core wire by diffusing the component of a second metal to the first metal through the mutual diffusion reaction between the first and second metals at the boundary region of the core wire, an alloy plated layer, which is formed on the core wire by diffusing the component of the first metal to the second metal through the mutual diffusion reaction between the first and second metals, and a plating layer, which is formed on the alloy plated layer and includes the second metal having a vaporization temperature lower than that of the first metal constituting the core wire. In this case, the alloy plated layer is formed on the core wire through the mutual diffusion reaction between the first and second metals, so that the alloy plated layer represents the highest hardness and the lowest elongate percentage among the layers. In addition, the alloy plated layer and the plating layer have cracks appearing perpendicularly to the longitudinal direction of the electrode wire.

In addition, the inventor of the present invention has suggested the structure of an electrode wire including a core wire including a first metal including copper, an alloy layer, which is formed from an outer portion of the core wire toward the center of the core wire by diffusing the component of a second metal to the first metal through the mutual diffusion reaction between the first and second metals at the boundary region of the core wire, and an alloy plated layer, which is formed on the core wire by diffusing the component of the first metal to the second metal through the mutual diffusion reaction between the first and second metals. In this case, the alloy plated layer is formed on the core wire through the mutual diffusion reaction between the first metal and the second metal having a vaporization temperature lower than that of the first metal to represent the hardness higher than that of the core wire and the elongation percentage lower than that of the core wire. The alloy plated layer has cracks appearing perpendicularly to the longitudinal direction of the electrode wire. The first metal includes copper, brass, or a copper alloy, and the second metal includes zinc, aluminum, tin, or the alloy thereof.

Further, the inventor of the present invention has suggested a method for manufacturing an electrode wire for electro-discharge machining in Korea Patent Registration No.

10-518731, in which the method includes preparing an intermediate wire rode, which serves as a core wire, includes a first metal including copper, and has a first diameter, forming an alloy layer, which represents the hardness higher than those of the first and second metals and the elongation percentage lower than those of the first and second metals, on an outer portion of the core wire through the mutual diffusion reaction between the first and second metals by passing the core wire including the first metal through a plating bath containing the second metal melted therein and having a vaporization temperature lower than that of the first metal and forming a plating layer including the second metal on the alloy layer, allowing cracks to appear on the alloy layer and the plating layer due to the higher hardness and the lower elongation percentage of the alloy layer by drawing the intermediate wire rod having the alloy and plating layers so that the intermediate wire rod has a second diameter, and stabilizing a mechanical characteristic of a fine wire by performing a heat treatment process with respect to the fine wire having the cracks.

In order to form the alloy and plating layers on the core wire, the core wire is passed through the plating bath for one second to ten seconds at a temperature of about 400° C. to about 500° C. The fist metal includes copper, brass, or a copper alloy, and the second metal includes zinc, aluminum, tin or the alloy thereof.

In addition, the inventor of the present invention has suggested a method for manufacturing an electrode wire for electro-discharge machining in Korea Patent Registration No. 10-518733, in which the method includes preparing an intermediate wire rode, which serves as a core wire, includes a first metal including copper, and has a first diameter, forming an alloy plated layer, which represents the hardness higher than those of the first and second metals and the elongation percentage lower than those of the first and second metals, on an outer portion of the core wire through the mutual diffusion reaction between the first and second metals by passing the core wire including the first metal through a plating bath containing the second metal melted therein and having a vaporization temperature lower than that of the first metal, allowing cracks to appear on the alloy plated layer due to the higher hardness and the lower elongation percentage of the alloy layer by drawing the intermediate wire rod having the alloy plated layer so that the intermediate wire rod has a second diameter, and stabilizing a mechanical characteristic of a fine wire by performing a heat treatment process with respect to the fine wire having the cracks.

According to the related arts, an electrode wire having an alloy layer including copper-zinc grain fragments is formed through the mutual diffusion reaction with a core wire metal including copper performed due to the melted zinc and applied heat, so that the machining speed can be improved. However, when performing an elongation process for a brass core wire representing 510N, the brass core wire is strengthened, so that an alloy plated layer provided at an outer portion of the core wire may be easily fragmented, thereby producing a great amount of micro-particles in electro-discharge machining.

PRIOR ART (1) Korean Patent Registration No. 10-518727
(2) Korean Patent Registration No. 10-518731
(3) Korean Patent Registration No. 10-518733

DISCLOSURE

Technical Problem

Accordingly, the present invention has been made keeping in mind the above problems occurring in the prior art, and an object of the present invention is to prevent an interfacial surface from being created on an electrode wire for electro-discharge machining by performing a heat treatment process after an electroplating process and a fine wire drawing process and to form a corrugation around the electrode wire. In other words, the electrode wire for electro-discharge machining has a smooth surface without the interfacial surface and the corrugation is formed on the surface of the electrode wire in a longitudinal direction of the electrode wire.

Another object of the present invention is to provide an electrode wire for electro-discharge machining, capable of forming an alloy layer through a heat treatment process for a plated layer at a temperature of 60° C. to 490° C., and manufacturing the electrode wire for electro-discharge machining having a corrugation on the surface of the alloy layer while maintaining the tensile strength in the range of 400 N/mm² to 1100 N/mm², thereby basically preventing grain fragments from being created due to cracks, and improving the machining speed and the surface roughness of a workpiece according to the increase of the surface area due to the formed corrugation while significantly reducing micro-powders.

Another object of the present invention is to provide an electrode wire for electro-discharge machining and a method for fabricating the same, capable of forming an alloy layer and an oxidization layer on the electrode wire for the electro-discharge machining by performing a heat treatment process with respect to the electrode wire for the electro-discharge machining without the interfacial surface at an oxidization atmosphere employing a temperature of 60° C. to 490° C., thereby maximizing the machining speed and the surface roughness of the workpiece.

As described above, an interfacial surface (crack) can be basically prevented from being created on the surface of the electrode wire having the alloy layer, and an oxidization layer is formed on the surface of the electrode wire having the alloy layer through the heat treatment process if necessary, thereby improving the surface roughness of the workpiece when performing the electro-discharge machining, and preventing micro-powders of the electrode wire while rapidly maintaining the machining speed.

Still another object of the present invention is to provide an eco-friendly electrode wire capable of improving the precision of the electro-discharge machining and reducing micro-powders.

Technical Solution

To accomplish these objects, according to one aspect of the present invention, there is provided an electrode wire for electro-discharge machining including a core wire including a first metal, a first alloy layer formed at a boundary surface of the core wire and a second metal through mutual diffusion between the second metal, which is plated on an outer surface of the core wire, and the core wire, and a second alloy layer formed at an outer portion of the first alloy layer through diffusion of the first metal toward the second metal. The second alloy layer is provided on a surface thereof with a corrugation having a predetermined pattern.

In addition, the core wire, the first alloy layer, and the second alloy layer are formed without cracks.

In addition, the electrode wire has a tensile strength in a range of about 400 N/mm² to 1100N/mm².

Further, the corrugation having the predetermined pattern formed on the second alloy layer is formed by an oxidization layer.

In addition, the first metal includes one of copper (Cu), brass, and a copper alloy, and the second metal includes one of zinc (Zn), aluminum (Al), tin (Sn), and an alloy thereof.

According to another aspect of the present invention, there is provided a method for manufacturing an electrode wire for electro-discharge machining. The method includes preparing a wire rod, which includes a first metal and has a first diameter, as a core wire, plating a second metal on the core wire, performing a fine wire process for the core wire plated with the second metal so that the core wire has a second diameter, while forming a corrugation having a predetermined pattern on a surface of the core wire having the second diameter, and performing a heat treatment process to form a first alloy layer at a boundary surface between the core wire and the second metal through a mutual diffusion between the core wire and the second metal, and a second alloy layer at an outer portion of the first alloy layer through diffusion of the first metal toward the second metal.

According to still another aspect of the present invention, there is provided a method for manufacturing an electrode wire for electro-discharge machining. The method includes preparing a wire rod, which includes a first metal and has a first diameter, as a core wire, plating a second metal on the core wire, performing a fine wire process for the core wire plated with the second metal so that the core wire has a second diameter, performing a heat treatment process to form a first alloy layer at a boundary surface between the core wire and the second metal through a mutual diffusion between the core wire and the second metal, and a second alloy layer at an outer portion of the first alloy layer through diffusion of the first metal toward the second metal, and forming an oxidization layer on a surface of the second alloy layer while forming a corrugation having a predetermined pattern on a surface of the oxidization layer.

The heat treatment process is performed for one hour to 120 hours at a temperature of 60° C. to 490° C.

In addition, the plating of the second metal on the core wire is performed through an electroplating scheme.

In addition, the heat treatment process is performed at an oxidization atmosphere.

Further, the first metal may include pure copper (Cu), or brass including 63 to 67 weight % of copper (Cu) and 33 to 37 weight % of zinc (Zn), and the second metal may include zinc (Zn), aluminum (Al), tin (Sn), or the alloy thereof.

The core wire having the first diameter is formed in the range of 0.9 mm to 1.2 mm, and the core wire having the second diameter is formed in the range of 0.07 mm to 0.35 mm.

The first alloy layer is formed in the range of about 1 μm to about 3 μm, and the second alloy layer is formed in the range of about 2 μm to about 20 μm.

In the heat treatment step after the fine wire process has been performed, the components of the second metal are diffused toward the first metal through the mutual diffusion reaction between the first metal and the second metal at the edge of the core wire rod, thereby forming the first alloy layer from the outer portion of the core wire toward the center of the core wire. In addition, the components of the first metal are diffused toward the second metal through the mutual diffusion reaction between the first metal and the second metal at the outer portion of the first alloy layer, thereby forming the second alloy layer representing a vaporization temperature lower than that of the first metal and higher than that of the second metal.

Advantageous Effects

As described above, according to the present invention, since the electrode wire for electro-discharge machining is subject to a heat treatment process at a temperature of 60° C. to 490° C. after the fine wire drawing process has been performed, the electrode wire for the electro-discharge machining is not cracked so that micro-fragments can be prevented from getting off the electrode wire in the electro-discharge machining.

In addition, when the micro-fragments are prevented from being created in the electro-discharge machining, re-discharge caused by the micro-fragments can be prevented, and a diamond guide dice hole through which the electrode wire passes can be prevented from being filled with the micro-fragments.

In addition, since a corrugation having a predetermined curved wave is formed on the surface of the electrode wire for the electro-discharge machining in the longitudinal direction of the electrode wire, the surface area of the electrode wire is increased, so that the machining speed and the surface roughness of the workpiece can be improved.

In particular, since a corrugated oxidization layer is formed on the surface of the electrode wire for the electro-discharge machining according to the present invention without cracks, that is, the interfacial surface, the rough surface of the workpiece can be maximized, and the machining speed can be improved.

The surface roughness and the machining speed are improved because micro-fragments are less created from the electrode wire having the surface area increased in spite of the limited diameter and the second alloy layer representing the vaporization temperature lower than that of the first metal mutually reacts to the oxidization layer to increase the explosion power of thermal energy in discharge.

BEST MODE

Figure 2:
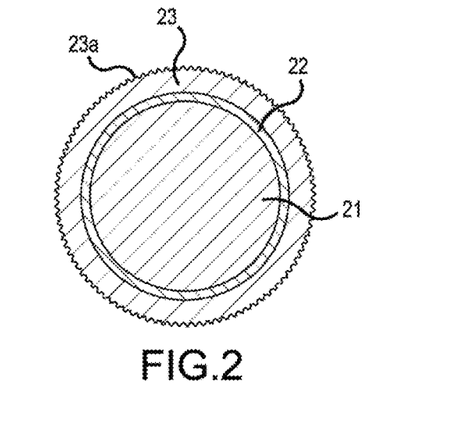
FIG. 2 is a schematic view showing the sectional surface of an electrode wire for electro-discharge machining according to a first embodiment of the present invention.

As shown in FIG. 2, an electrode wire for electro-discharge machining according to the present invention includes a brass core wire 21, which is finely formed with a diameter of 0.25 mm and includes 65 weight % of copper and 35 weight % of zinc. The brass core wire 21, which has been finely formed, includes a first alloy layer 22 having a size of about 1 μm to about 3 μm and a second alloy layer 23 having a size of about 2 μm to about 20 μm. A corrugation 23*a* is formed on the surface of the second alloy layer 23. The corrugation 23*a* may be formed by using an additional dice roller (not shown) for forming a wrinkle during a fine wire process for a plated core wire.

Figure 4:
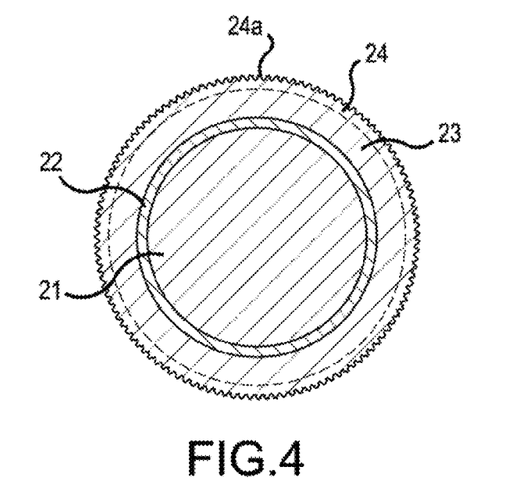
FIG. 4 is a schematic view showing the sectional surface of an electrode wire for electro-discharge machining according to a second embodiment of the present invention.

In addition, according to another example, the electrode wire for electro-discharge machining according to the present invention may be finely formed with a diameter of about 0.25 mm and include the brass core wire 21 including 65 weight % of copper and 35 weight % of zinc. The brass core wire 21, which has been finely formed, includes the first alloy layer 22 having a size of about 1 μm to about 3 μm and the second alloy layer 23 having a size of about 2 μm to about 20 μm. The second alloy layer 23 is provided on the surface thereof with an oxidization layer 24 having a corrugation 24a. The corrugation 24a formed in the oxidization layer 24 may be obtained by properly controlling the condition of forming the oxidization layer 24.

In particular, according to the electrode wire for electro-discharge machining of the present invention, since the first alloy layer 22 and the second alloy layer 23 are formed on an outer layer of the core wire 21 through the mutual diffusion reaction between the core wire 21 and zinc metal as the core wire plated with zinc is subject to a heat treatment process for predetermined hours at the low temperature of 60° C. to 490° C. after the core wire with zinc has been finely formed, the interfacial surface or cracks are not formed, and the tensile strength of the electrode wire can be maintained in the range of about 400 N/mm$^2$ to 1100N/mm$^2$.

The electrode wire for electro-discharge machining having the above structure is secondarily subject to a heat treatment step so that the mechanical property of the electrode wire can be more stabilized.

Figure 3:
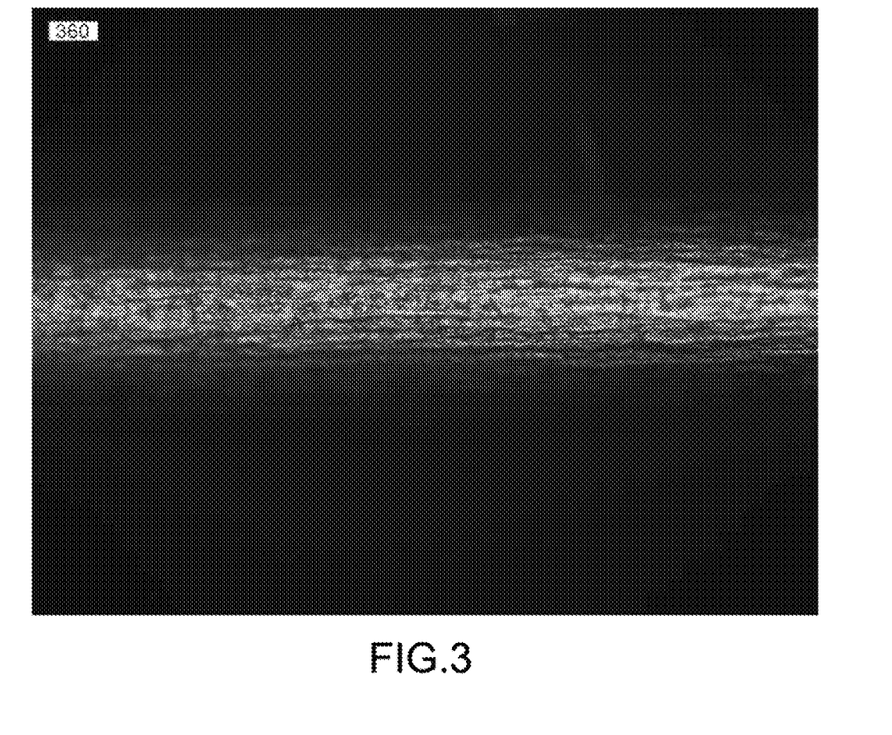
FIG. 3 is a photograph showing an electrode wire product for electro-discharge machining according to the first embodiment of the present invention.
Figure 5:
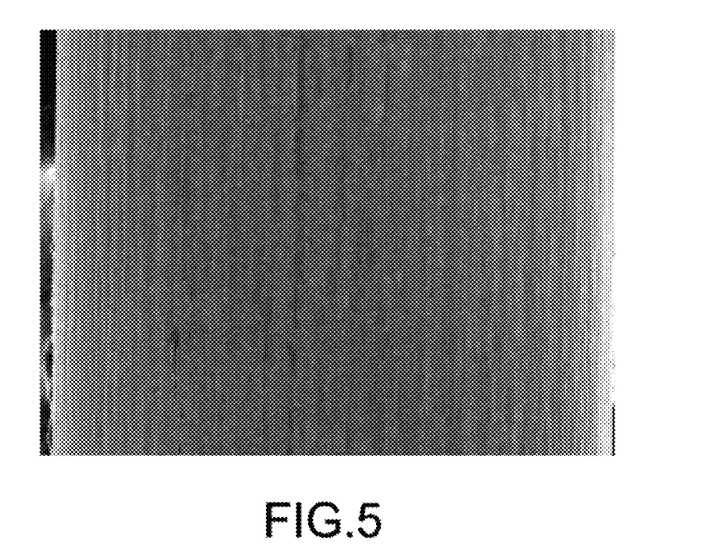
FIG. 5 is a photograph showing an electrode wire product for electro-discharge machining according to the second embodiment of the present invention.

FIG. 3 is a photograph showing the electrode wire for electro-discharge machining according to the present invention, the surface of which has no oxidization layer, and FIG. 5 is a photograph showing the electrode wire for electro-discharge machining according to the present invention, the surface of which has an oxidization layer.

Referring to FIGS. 3 and 5, although cracks or the evidences (interfacial surfaces) of the cracks are not shown on the surface of the electrode wire, the surface is maintained in a smoothing state while a corrugation is formed on the surface of the electrode wire in a longitudinal direction of the electrode wire at a predetermined pattern.

The core wire 21 may include various metals including copper or brass. The electrical conductivity and the mechanical strength required as an electrode wire are satisfied by the core wire 21. The second alloy layer 23 includes a material representing a melting point and a vaporization temperature lower than those of a material, such as zinc, constituting the core wire 12 to protect the core wire 12 and to improve the machining speed when the electro-discharge machining is performed.

Regarding the required properties of the material to be plated, the material must represent a melting point and a vaporization temperature lower than those of the core wire 21, must be electroplated on the core wire including copper (Cu) or brass, and must allow an alloy layer to represent a lower vaporization temperature through a diffusion reaction in the heat treatment process after the electroplating process has been performed. The metal includes zinc (Zn), aluminum (Al), or tin (Sn).

As shown in FIGS. 2 to 5, the corrugated surface is homogeneous without cracks, so that the fragments may be less crated from the core wire and the alloy layer in the electrode wire when performing electro-discharge machining, and the surface roughness of a workpiece may be increased.

Hereinafter, a method for manufacturing the electrode wire for the electro-discharge machining having the above structure according to the present invention and the operating effects thereof will be described in detail through Embodiments 1 and 2.

[Embodiment 1]

A core wire (including the first metal) having a diameter of about 0.9 mm, which is a brass wire having a compositional ratio of about 65 weight % of copper and about 35 weight % of zinc, is prepared as an intermediate wire rod.

The core wire is cleaned while passing through an alkaline degreasing bath. Then, after the core wire is subject to an acidic washing process, the core wire is cleaned again.

Then, a zinc-electroplating process is performed with respect to the washed core wire by using zinc serving as second metal and applying current of 770 A at a line speed of 20 m/min so that the core wire is plated at a predetermined thickness.

Thereafter, the intermediate wire rod, which has been subject to the zinc-electroplating process, is finely drawn so that the intermediate wire rod has a diameter of 0.25 mm.

During the fine wire drawing process, a corrugation having a predetermined pattern is formed on the surface of the intermediate wire rod by passing the intermediate wire rod through a dice (jig, not shown) for forming a wrinkle. The corrugation formed on the surface of the intermediate wire rod is formed by engraving the surface of the fine wire, which maintains the diameter of a finished product, in the shape of a wave.

Thereafter, the intermediate wire rod, which is finely formed and strengthened, and has the diameter of the finished product, is subject to the heat treatment process at a temperature of 60° C. to 490° C. for one hour to 120 hours.

The first alloy layer 22 including copper-zinc is formed at the boundary surface between the core wire (first metal) and the second metal, which is zinc-electroplated, through the mutual diffusion reaction between the core wire and the second metal by the above heat treatment process, and the second alloy layer 23 including zinc-copper is formed at the outer portion of the first alloy layer 22.

Since the first alloy layer 22 and the second alloy layer 23 are formed through mutual thermal diffusion, the shape of the corrugation 23a formed before the mutual thermal diffusion can be maintained.

Although the schematic view of FIG. 2 shows that the boundary part between the first alloy layer 22 and the second alloy layer 23 is smoothly formed, the shape of the boundary part to distinguish between the first and second alloy layers 22 and 23 may be varied according to the corrugation or the diffusion thickness of the alloy layer.

The second alloy layer including zinc-copper represents the highest hardness and an elongation ratio lower than that of the core wire.

Due to the zinc-electroplating process and the mutual diffusion, the first alloy layer including copper-zinc is formed in the size of 1 μm to 3 μm at the boundary surface of the core wire and the second alloy plated layer including zinc-copper is formed in the size of 2 μm to 20 μm at an outer portion of the first alloy layer.

The first alloy layer is formed due to the mutual diffusion reaction between the first metal constituting the core wire and zinc (i.e., the second metal) plated in the electroplating process, and the second alloy layer is formed by diffusing the components of the first metal constituting the core wire toward the second metal that is zinc-electroplated.

Since the electrode wire including the first and second alloy layers formed on the core wire is subject to the heat treatment process after the fine wire process, the surface of the electrode wire corrugated in a predetermined pattern is not cracked as shown in FIG. 3, but maintained with the tensile strength of 400 N/mm$^2$ to 1100N/mm$^2$.

According to the electrode wire for electro-discharge machining, the mechanical property of the electrode wire can be stabilized by additionally performing the heat treatment process within 0.05 seconds to 3 seconds at the temperature of 300° C. to 600° C.

Two workpieces subject to the electro-discharge machining by using the above-fabricated electrode wire for the electro-discharge machining are compared with a workpiece subject to the electrode-discharge machining by using a brass electrode wire according to the related art in terms of the machining speed, and the surface roughness and the comparative measurement results are shown in table 1.

The workpieces are compared with each other in terms of the machining speed and the surface roughness in the case of forming a start hole at the center of a metallic board (SKD-11) having a thickness of 40 mm and performing electro-discharge machining for the workpieces to form a hexahedron having a length of 20 mm, a width of 10 mm, and a thickness of 40 mm.

The front and rear sides of the workpiece described in table 1 refer to both sides of the workpiece at the region of 20 mm of the workpiece, and the primary to tertiary cuttings refer to the process for sequentially trimming a cut part of the workpiece three times after initially cutting the workpiece.

TABLE 1

| classification | | embodiment 1 (sample 1) | embodiment 1 (sample 2) | conventional brass wire |
| --- | --- | --- | --- | --- |
| initial cutting time | | 18 mins 33 secs | 18 mins 28 secs | 20 mins 22 secs |
| primary cutting time for trimming | | 12 mins 43 secs | 12 mins 51 secs | 12 mins 57 secs |
| secondary cutting time for trimming | | 8 mins 25 secs | 8 mins 25 secs | 8 mins 29 secs |
| tertiary cutting time for trimming | | 8 mins 51 secs | 8 mins 14 secs | 9 mins 42 secs |
| total cutting time | | 48 mins 32 secs | 47 mins 58 secs | 51 mins 30 secs |
| cutting time ratio | | 106% | 107% | 100% |
| surface roughness (ra) | front side | 0.288 | 0.287 | 0.395 |
| surface roughness (ra) | rear side | 0.272 | 0.293 | 0.374 |

As described in table 1, the electrode wire for electro-discharge machining according to the first embodiment can significantly improve the surface roughness of the workpiece even though the machining speed of the workpiece is slightly increased when the electro-discharge machining is performed.

[Embodiment 2]

A core wire (including the first metal) having a diameter of about 0.9 mm, which is a brass wire having a compositional ratio of about 65 weight % of copper and about 35 weight % of zinc, is prepared as an intermediate wire rod.

The core wire is cleaned while passing through an alkaline degreasing bath. Then, after the core wire is subject to an acidic washing process, the core wire is cleaned again.

Then, a zinc-electroplating process is performed with respect to the washed core wire by using zinc serving as second metal and applying current of 770 A at a line speed of 20 m/min so that the core wire is plated at a predetermined thickness.

Thereafter, the intermediate wire rod, which has been subject to the zinc-electroplating process, is finely drawn so that the intermediate wire rod has a diameter of 0.25 mm.

Thereafter, the intermediate wire rod, which has been finely formed and strengthened, is subject to a heat treatment process for one hour to 120 hours at an oxidization atmosphere of 60° C. to 490° C.

In particular, when the oxidation layer 24 of FIG. 4 is formed during the heat treatment process, the corrugation 24a having a predetermined pattern may be formed on the surface of the oxidization layer 24 in a longitudinal direction of the electrode wire by properly controlling the condition of forming the oxidization layer 24.

While the first and second alloy layers are being formed, the shape of the corrugation 24a is determined according to the conditions such as the temperature and the time of an oxygen atmosphere, and an amount of introduced oxygen in the process of forming the oxidation layer by diffusing and infiltrating oxygen into a predetermined depth of the zinc-electroplated layer.

In other words, together with the formation of the oxidization layer having the pattern, during the heat treatment process, the first alloy layer 22 including copper-zinc is formed through the mutual diffusion reaction at the boundary surface between the core wire (first metal) and the second metal that is zinc-electroplated, the second alloy layer 23 including zinc-copper is formed at the outer portion of the first alloy layer 22, and the oxidization layer 24 having the corrugation 24a is formed at the outer portion of the first alloy layer 22.

The second alloy layer including zinc-copper represents the highest hardness and an elongation ratio lower than that of the core wire.

Due to the mutual diffusion, the first alloy layer including copper-zinc is formed in the size of 1 μm to 3 μm at the boundary surface of the core wire and the second alloy plated layer including zinc-copper is formed in the size of 2 μm to 20 μm at an outer portion of the first alloy layer. The first alloy layer is formed due to the mutual diffusion reaction between the first metal of the core wire and zinc (i.e., the second metal), which is a material plated in the electroplating process, and the second alloy layer is formed by mutually diffusing the first metallic component constituting the core wire toward the second metal that is zinc-electroplated.

While the first and second alloy layers are being formed, the oxidization layer 24 having the corrugation 24a is formed on the surface of the second alloy layer. The corrugation 24a formed by the oxidization layer 24 formed on the surface of the second alloy layer is engraved in the shape of a wave. Since the electrode wire fabricated as described above is subject to the heat treatment process after the fine wire process, cracks or an interfacial surface is created on the surface of the electrode wire as shown in FIG. 5, but the tensile strength of the surface is maintained in the range of 400 N/mm$^2$ to 1100N/mm$^2$.

The electrode wire for electro-discharge machining is additionally subject to a heat treatment step within 0.05 secs to 3 secs at the atmosphere having a temperature of 300° C. to 600° C., so that the mechanical property of the electrode wire can be more stabilized.

Two workpieces subject to the electro-discharge machining by using the above-fabricated electrode wire for the electro-discharge machining are compared with a workpiece subject to the electrode-discharge machining by using a conventional brass electrode wire in terms of the machining speed, and the surface roughness and the comparative measurement results are shown in table 1.

The workpieces are compared with each other in terms of the machining speed and the surface roughness in the case of forming a start hole at the center of a metallic board (SKD-11) having a thickness of 40 mm and performing electro-discharge machining for the workpieces to form a hexahedron having a length of 20 mm, a width of 10 mm, and a thickness of 40 mm.

The front and rear sides of the workpiece described in table 2 refer to both sides of the workpiece at the range of 20 mm of the workpiece, and the primary to tertiary cuttings refer to processes of sequentially trimming a cut part of a workpiece three times after the workpiece has been initially cut.

TABLE 2

| classification | | embodiment 1 (sample 1) | embodiment 1 (sample 2) | conventional brass wire |
|---|---|---|---|---|
| initial cutting time | | 19 mins 22 secs | 19 mins 14 secs | 20 mins 22 secs |
| primary cutting time for trimming | | 12 mins 35 secs | 12 mins 29 secs | 12 mins 57 secs |
| secondary cutting time for trimming | | 8 mins 42 secs | 8 mins 27 secs | 8 mins 29 secs |
| tertiary cutting time for trimming | | 9 mins 33 secs | 9 mins 26 secs | 9 mins 42 secs |
| total cutting time | | 50 mins 12 secs | 49 mins 36 secs | 51 mins 30 secs |
| cutting time ratio | | 103% | 104% | 100% |
| surface roughness (ra) | front side | 0.279 | 0.259 | 0.395 |
| surface roughness (ra) | rear side | 0.247 | 0.256 | 0.374 |

As described in table 1, the electrode wire for electro-discharge machining according to the second embodiment can greatly improve the surface roughness of the workpiece even though the machining speed of the workpiece is significantly increased when the electro-discharge machining is performed.

As described above, according to the first and second embodiments, the surface of the electrode wire becomes smooth without cracks, and the surface areas of the electrode wire are increased due to the corrugation formed on the surface of the electrode wire. Accordingly, micro-fragments are less created, and the machining speed and the surface roughness of the workpiece can be improved.

In addition, according to the first and second embodiments, the first metal may include copper (Cu) or the alloy thereof in addition to brass, and the second metal may include silver (Ag), zinc (Zn), aluminum (Al), tin (Sn), or the alloy thereof.

Although a preferred embodiment of the disclosure has been described for illustrative purposes, those skilled in the art will appreciate that various modifications, additions and substitutions are possible, without departing from the scope and spirit of the invention as disclosed in the accompanying claims.

DESCRIPTION OF THE SIGN

1-Workpiece
2-ELECTRODE WIRE
3-Supply reel
4-Winding reel
5,5'-Rollers
6-Power supply
7-Start hole
21-Brass core wire
22-First alloy layer
23-Second alloy layer
23a,24a-Shape of the corrugation
24-Oxidation layer

The invention claimed is:

1. A method for manufacturing an electrode wire for electro-discharge machining, the method comprising:
preparing a wire rod, which includes a first metal and has a first diameter, as a core wire;
plating a second metal on the core wire;
performing a fine wire process for the core wire plated with the second metal so that the core wire has a second diameter;
performing a heat treatment process to form a first alloy layer at a boundary surface between the core wire and the second metal through mutual diffusion between the core wire and the second metal, and a second alloy layer at an outer portion of the first alloy layer through diffusion of the first metal toward the second metal; and
forming an oxidization layer on a surface of the second alloy layer while forming a corrugation having a predetermined pattern on a surface of the oxidization layer.

2. The method of claim 1, wherein the heat treatment process is performed for one hour to 120 hours at a temperature of 60° C. to 490° C.

3. The method of claim 2, wherein the plating of the second metal on the core wire is performed through an electroplating scheme.

4. The method of claim 3, wherein the first metal includes one of copper (Cu), brass, and a copper alloy, and the second metal includes one of zinc (Zn), aluminum (Al), tin (Sn), and an alloy thereof.

5. The method of claim 2, wherein the heat treatment process is performed at an oxidization atmosphere.

6. The method of claim 5, wherein the plating of the second metal on the core wire is performed through an electroplating scheme.

7. The method of claim 6, wherein the first metal includes one of copper (Cu), brass, and a copper alloy, and the second metal includes one of zinc (Zn), aluminum (Al), tin (Sn), and an alloy thereof.

8. A method for manufacturing an electrode wire for electro-discharge machining, the method comprising:
preparing a wire rod, which includes a first metal and has a first diameter, as a core wire;
plating a second metal on the core wire;
performing a fine wire process for the core wire plated with the second metal so that the core wire has a second diameter, while forming a corrugation having a predetermined pattern on a surface of the core wire having a second diameter; and
performing a heat treatment process to form a first alloy layer at a boundary surface between the core wire and the second metal through mutual diffusion between the core wire and the second metal, and to form a second alloy layer at an outer portion of the first alloy layer through diffusion of the first metal toward the second metal.

* * * * *